Aug. 8, 1967  J. M. MALJANIAN  3,334,813
TEMPERATURE TRANSDUCER
Filed Nov. 19, 1964  2 Sheets-Sheet 1

INVENTOR
JOHN M. MALJANIAN
BY *Prentiss*
ATTORNEY

INVENTOR
JOHN M. MALJANIAN
BY
ATTORNEY

United States Patent Office 3,334,813
Patented Aug. 8, 1967

3,334,813
TEMPERATURE TRANSDUCER
John M. Maljanian, Newington, Conn., assignor to
Chandler Evans Inc., a corporation of Delaware
Filed Nov. 19, 1964, Ser. No. 412,501
2 Claims. (Cl. 236—92)

ABSTRACT OF THE DISCLOSURE

High dynamic response differential expansion temperature sensing probe that positions a spool valve to control a source of pressurized fluid to produce a finite value of outlet pressure for each value of sensed temperature, with a pressure operated feedback bellows located in the outlet pressure circuit and connected to the spool valve to move the spool valve in the opposite direction of the initial valve displacement to produce an outlet pressure that is linearly proportional to the movement of the temperature sensing probe.

---

This invention relates to temperature measurement devices and more particularly to temperature transducers wherein the sensed temperature is converted into a hydraulic pressure signal proportional to the sensed temperature.

The safe and efficient operation of many thermally responsive devices, particularly gas turbine engines, requires the accurate measurement and control of temperatures in the region of 1800° F. Further, the temperature sensing apparatus required to measure temperatures in the region of 1800° F. when utilized in gas turbine engine applications must be capable of rapidly responding to small step changes in temperature and must also continue to remain accurate and dynamically responsive to small temperature changes after an extended period of operation.

Heretofore, thermocouple devices have been the primary form of temperature sensing instrumentation used for high temperature probes. However, thermocouple devices become unreliable and inaccurate at temperatures of 1800° F., particularly when exposed to the high velocity fluid flow of gas turbine engines. Also, the long lead lines connecting the thermocouple probe to the temperature responsive control unit are exposed to ambient temperature conditions differing from those adjacent to thermocouple probe, and unless great care is exercised to shield these lead wires, the lead wires constitute a source of error that causes the thermocouple installation to record erroneous temperatures. Furthermore, the errosive effect of the high temperature, high velocity fluid stream of the gas turbine engine causes the junction of the thermocouple probe exposed to this fluid stream to become inoperative after a relatively short period of operation.

It is the purpose of this invention to solve these problems relating to the operation of a high temperature measurement device by devising a temperature probe that will accurately measure temperature in the range of 1800° F. while simultaneously providing means capable of transmitting a high response accurate temperature signal to a remote location.

Accordingly, one of the principal objects of the present invention is to provide a temperature probe that will measure small temperature changes in the region of 1800 F. and will transmit a high response accurate temperature signal to a remote location such that each finite sensed temperature change is translated into a fluid pressure proportional to each such finite temperature change.

Another object of the invention is to provide a temperature probe that will accurately measure small temperature changes in the region of 1800° F. with a high response rate and by means of a fluid servo system transduced this temperature signal into a fluid pressure signal proportional to temperature.

A further object of the invention is to provide a temperature transducer, wherein a thermally responsive differential expansion device is employed as the temperature sensing element, arranged with a fluid servo mechanism having a position negative feedback such that the output motion of the differential expansion element is transduced into a fluid pressure that is proportional to the sensed temperature.

A fluid servo mechanism in accordance with this invention by definition comprises a unit wherein a feedback signal must be developed to act in opposite sense to the control signal, and an output member is adapted to move in relation to a fixed reference value with a member responsive to the output member adapted for feedback movement to and fro about a neutral position.

Further objects of the invention are to devise a temperature transducer that embodies the following novel features:

(a) Use of a differential expansion temperature sensing probe comprising a thin sensing element enclosing a relatively thick sensing element with a coefficient of thermal expansion different from the thin element with these two elements so arranged that they produce a high response output motion as a function of the sensed temperature.

(b) Use of a hydraulic servo system operatively connected to the differential expansion temperature sensing probe such that the axial displacement of the temperature probe is translated into a hydraulic pressure that is proportional to the temperature sensed by the differential expansion probe wherein the hydraulic pressure can be transferred by means of appropriate conduits to a remote position where this temperature related pressure signal can be utilized as a control signal to operate a variety of pressure responsive control devices.

Other and further objects of the invention will become apparent to those skilled in the art as the description proceeds.

With these and other objects in view which may be incidental to the improvements described hereinabove, the invention comprises the combination and arrangement of elements hereinafter described and illustrated in the accompanying drawings in which.

Figure 1:
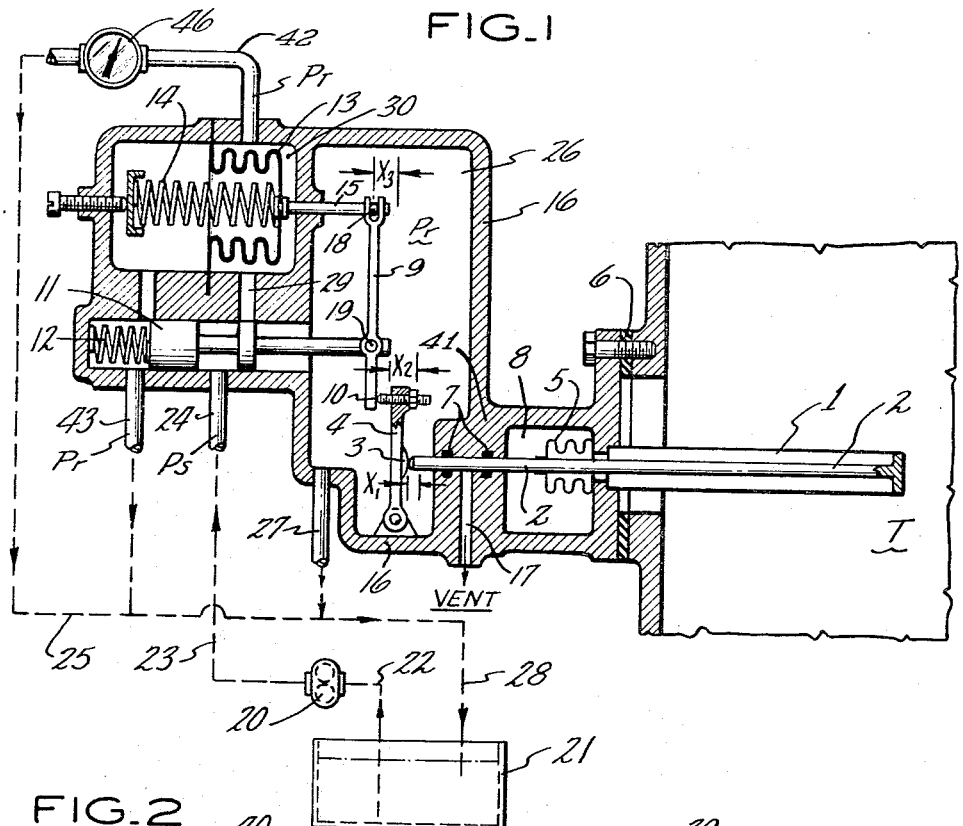
FIGURE 1 is a schematic sectional view of a temperature transducer system embodying the principle and novel features of the invention.

As shown in FIGURE 1, the temperature measuring device to which the improved temperature transducer shown generally at 41 auulies comprises a thermally responsive differential expansion temperature sensing element having a high coefficient of expansion outer shell 1 and low coefficient of expansion rod 2 such that a change in temperature T at the point of contact with outer shell 1 would produce an axial motion of rod 2 which is a function of sensed temperature T. The rod 2 and the shell 1 are attached to each other at the outboard tip by a suitable weld. The inboard end of shell 1 is rigidly attached to housing 16. Bellows 5 is secured to housing 16 and rod 2 in a fluid tight manner such that the annular cavity between shell 1 and rod 2 is enclosed on one end by the weld and the other end by bellows 5 to become a fluid tight seal to the outside atmosphere. The annular sealed cavity between rod 2 and shell 1 is evacuated and charged with an inert gas to prevent oxidation of the inner rod during the high temperature operation. As an example, the shell 1 may be made of Inconel X and rod 2 made of tungsten, with this choice of materials the coefficient of expansion of shell 1 is greater than that of rod 2. Hence, an increase in sensed temperature T would cause rod 2 to move to the right relative to housing 16. Were the sensed temperature T to decrease, the rod 2 would move to the left relative to housing 16. Lever 4 is fixedly pivotably mounted to housing 16. Rod 2 contacts lever 4 at position 3 such that axial motion of rod 2 is amplified through linkage 4 and produces a magnified input motion to lever 9 at point 10. Lever 9 is pivotably mounted by pivot 19 to servo valve 11 and to bellows extention 15 by pivot 18.

The fluid servo is supplied with a high pressure supply $P_s$ which is obtained in any suitable manner such as by pump 20 from fluid supply 21 through conduits 22 and 23 to the high pressure inlet port 24 of servo valve 11. Servo valve 11 is supplied with a return port 43 connected by conduit 25 to a low pressure sink $P_r$. Cavity 26 is maintained at the low pressure sink pressure $P_r$ by means of conduit 27 which communicates with conduit 25 and thence conduit 28 to the low pressure sink $P_r$. The fluid that produces supply pressure $P_s$ may be hydraulic or pneumatic. The hydraulic pressure source of supply 21 and its communicating hydraulic pump 20 represents but one possible source of supply. The hydraulic pressure source shown in FIGURE 1 could just as readily be a pneumatic source such as compressed air bled from the gas turbine engine, or an independent source of pneumatic pressure.

A double seal 7 surrounds rod 2 to prevent fluid leakage from cavity 26 into lower probe cavity 8. Vent 17 intermediate the first and second elements of double seal 7 is provided to prevent any leakage that may occur past the first element of double seal 7 from entering cavity 8. Insulating gasket 6 is provided to reduce the heat transfer between the mounting surface and housing 16.

The characteristic operation of the temperature transducer, shown in FIGURE 1, is such that an increase in temperature T will produce a differential expansion between shell 1 and rod 2 such that rod 2 will be moved axially to the right or in an outboard direction. This outboard movement of rod 2 will cause lever 4 to be urged in a clockwise direction about its fixed pivot by spring 12 acting through valve 11 and lever 9 to contact point 10 with lever 4. Servo valve 11 is so constructed that it has an axial fluid pressure balance and the only unbalanced force exerted on servo valve 11 when lever 4 moves in a clockwise direction is that of spring 12. Pressure responsive means comprising bellows 13 and spring 14 is so constructed that the magnitude of the axial force of spring 14 is under all conditions greater than that of spring 12. Thus, when an increase in temperature causes a clockwise movement of lever 4, lever 9 will pivot about pivot 18 as a fixed pivot and spring 12 will urge servo valve 11 to the right, and cause lever 9 through pivot 19 to move in a counterclockwise direction until contact point 10 is in engagement with lever 4. This movement of servo valve 11 results in a change in the magnitude of the supply pressure $P_s$ that is communicated through conduit 29 to chamber 30. This increase in supply pressure $P_s$ reacts against bellows 13 and spring 14, causing bellows 13 and spring 14 to be compressed, thus moving bellows extension 15 to the left. Lever 9 now fixedly pivots about contact point 10. Thus lever 9 through pivot 18 is moved in a counterclockwise direction and causes servo valve 11 through pivot 19 to move to the left and thus perform its negative position feedback function. This movement of servo valve 11 to the left performs a throttling action and reduces the supply pressure $P_s$ into chamber 30 until the reduced supply pressure $P_s$ balances the force of spring 14 and bellows 13. This balance condition represents the fluid or hydraulic null. Thus, the fluid servo mechanism defined infra comprises, as shown in FIGURE 1, a feedback signal ($X_3$) generated by the pressure ($P_T$) in chamber 30 displacing bellows 13, and communicating said signal to spool valve 11 via bellows extension rod 15, lever 9 and contact point 10 of lever 4 to move spool valve 11 in the opposite direction to the initial control valve displacement imparted by the signal displacement ($X_2$). The controlled output member (bellows 13) is adapted to move in relation to a fixed reference determined by the initial force of spring 14, with the spool valve member 11 responsive to the movement of bellows 13 communicated to said spool valve member 11 via interconnected linkage members 15, 9 and 4, moving to and fro about a fluid null or neutral position. Also, the servo controlled supply pressure, as represented in chamber 30 by pressure $P_T$, is the controlled or regulated output pressure that is proportional to the temperature as represented by the displacement of rod 2. Thus, it can be seen a temperature change produces an output motion of lever 4 which is amplified through the linkage lever arm ratio to produce a deflection at servo valve 11 from its null point. Deflection of servo valve 11 will reduce or increase the pressure $P_T$ against bellows 13 and calibrated spring 14 to return the servo valve 11 to its null position. In this manner the pressure differential $P_T-P_R$ is maintained and controlled to be an exact measure of the deflection of lever 4. The controlled differential pressure $P_T-P_R$ can be utilized in many convenient forms, such as a differential pressure gage 46 which can be calibrated to read temperature directly, or the pressure signal can be transmitted by conduits to a remote location to operate a variety of pressure responsive control units.

Figure 2:
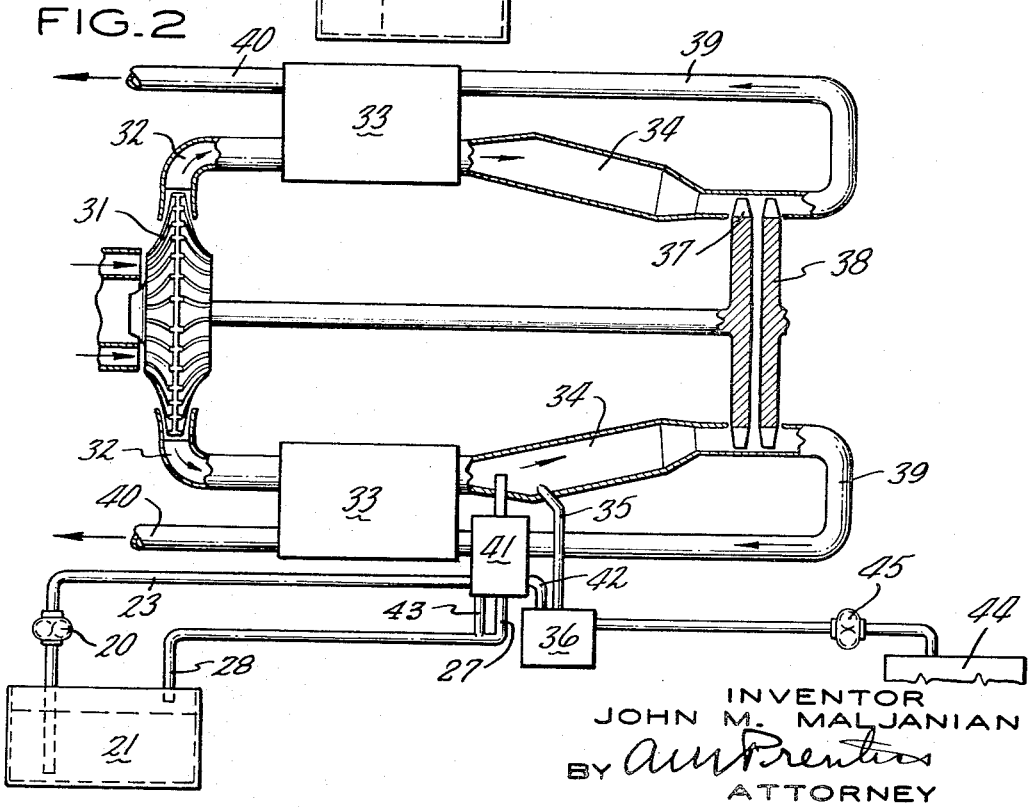
FIGURE 2 is a simplified block and schematic diagram showing an example of one type of system in which the temperature transducer invention of FIGURE 1 has particular utility.

FIGURE 2 indicates an example of an embodiment or type of system wherein the invention shown in FIGURE 1 has particular utility. FIGURE 2 shows in schematic form a gas turbine engine comprising a compressor 31 which compresses intake air and conveys it by means of conduit 32 to a heat recuperator 33 thence to a burner or combustion chamber 34 where the compressed air with the heat added from recuperator 33 is mixed with a controlled amount of fuel delivered through conduit 35 from fuel control 36 via fuel supply 44, and fuel pressure pump 45. The mixture is then ignited to further raise the temperature of the compressed air. This hot gas is then passed through turbine 37 and thence through turbine 38 where the exhaust gases from turbine 38 are directed by means of conduit 39 through recuperator 33 and finally exhausted to atmosphere through exhaust port 40. The temperature transducer 41, as described in detail in FIGURE 1, is inserted in the burner inlet duct as shown in FIGURE 2 such that the temperature sensing probe senses the burner inlet temperature of the compressed air. Thus, through the operation of temperature transducer 41, a change in burner inlet temperature will cause supply pump 20 acting through supply source 21 and conduit 23 to provide an output pressure $P_T$ through conduit 42 to fuel control 36 that will cause fuel control 36 to correct the main fuel flow and thus control the turbine inlet temperature as a function of sensed burner inlet temperature.

The construction of the temperature transducer, as shown in FIGURE 1, is such that the change in sensed temperature in at least one embodiment can be a linear function of the output pressure $P_T$ of the fluid servo. The following analysis will illustrate the linear relationship of the output pressure $P_T$ of the hydraulic servo to a change in sensed temperature T. For the purpose of this analysis, assume the following relationships:

$a_1$=coefficient of expansion of tube 1
$a_2$=coefficient of expansion of rod 2
$l$=the length of the tube and rod exposed to temperature T at some reference temperature $T_r$
$\Delta T$=the given change in sensed temperature T
$X_1$=the stroke of rod 2.

Using the above notation, the following equation holds:

$$X_1 = l(a_1 - a_2)\Delta T \quad (1)$$

If $k_1$ is the lever arm ratio between the point of contact 3 on lever 4 and the output of lever 4 at contact point 10, then $X_2 = k_1 X_1$, where $X_2$ is the motion at 10.

Since at steady state condition (when temperature T is fixed) the pivot 19 is always in the same fixed position, we may proceed as follows:

Under steady state conditions, if $K_2$ is the lever arm ratio between the output at 18 and the input at 10 of lever 9, then $X_3 = k_2 x_2$ where $X_3$ is the motion of the bellows or the motion at pivot 18.

Since $X_2 = k_1 x_1$, then by substitution $X_3 = k_2 k_1 x_1$.

If the combined spring rate of the bellows 13 and calibrated spring 14 is $K_s$ and the bellows effective area is $A_B$, then the change in pressure $\Delta(P_T - P_R)$ is as follows:

$$\Delta(P_T - P_R) = \frac{\text{change in force along bellows axis}}{A_B} \quad (2)$$

Then by substitution $$\Delta(P_T - P_R) = \frac{K_s \Delta X_3}{A_B} \quad (3)$$

$$= \frac{K_s k_1 k_2 \Delta x_1}{A_B} \quad (4)$$

$$= K_s k_1 k_2 l(a_1 - a_2)\Delta T \quad (5)$$

$$\Delta(P_T - P_R) = K \Delta T \quad (6)$$

Where K of Equation 6 is a constant determined for any particular design.

Thus, it can be seen for any fixed starting reference point a unique relationship between $P_T - P_R$ and temperature T is established such that for any change in temperature T the change in $P_T - P_R$ is directly proprotional.

Figure 4:
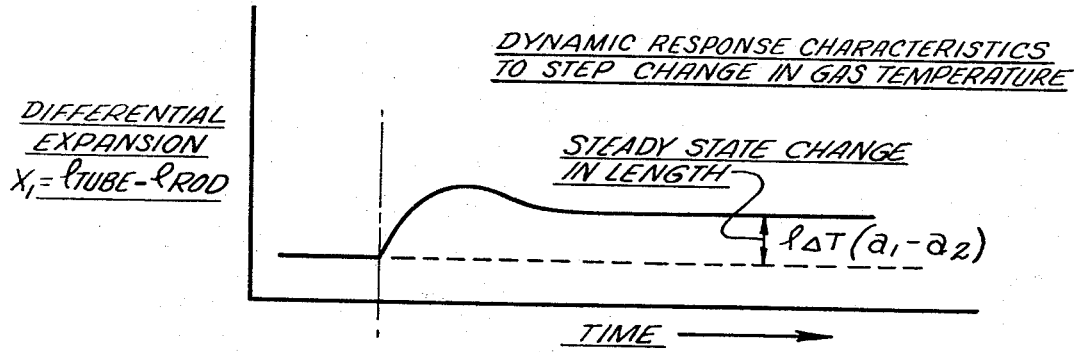
FIGURE 4 is a graphical plot of the resultant change in length or differential expansion of the two elements of the temperature sensing probe showing the lead characteristic of the probe.

The construction of the temperature sensing element is such that this thermally responsive differential expansion device will produce an output motion with a very rapid dynamic response rate that has a degree of "lead" built into its operation. To illustrate this condition, the shell 1 of the temperature sensing probe is made relatively thin and is arranged so as to surround the relatively thick or massive element 2. The one end of the two elements 1 and 2 is welded in a fluid type arrangement while the other end contains a bellows 5 that is constructed in a fluid type manner to the housing 16 and the rod 2 so that the annular space between rod 2 and shell 1 is maintained sealed from the fluid whose temperature is being sensed. Thus, the thin walled shell 1 will respond more rapidly to a step change in temperature than will the massive rod 2, as shown by a comparison of curves 44 and 45 of FIGURE 4.

Figure 3:
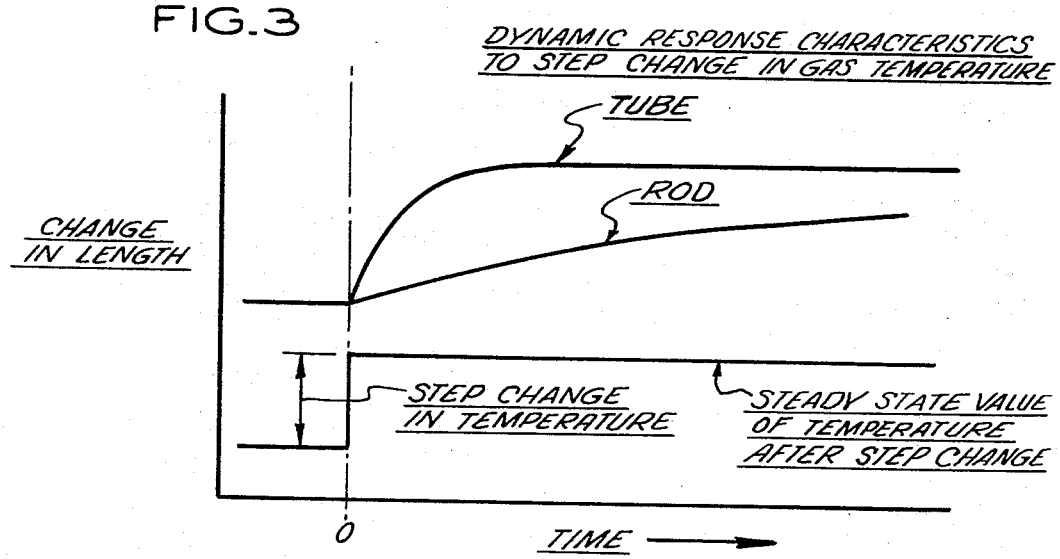
FIGURE 3 is a graphical plot of the change in length with respect to time in each of the temperature sensing elements in response to a step function temperature change.

The resultant differential expansion obtained from the dference of the rates of expansion of the tube 1 and the rod 2 when plotted on the same time base and starting at the same time zero point established by the start of the step temperature change for the two elements, as shown in FIGURE 3, indicates the form of the differential expansion dynamic response of the complete temperature sensing probe. This resultant differential expansion, shown in FIGURE 4, indicates that during the transient period the differential change $X_1$ builds up to its final steady state value more rapidly than if both elements 1 and 2 had the same response. Thus, this differential expansion device has a degree of "lead" built into its operation.

Figure 5:
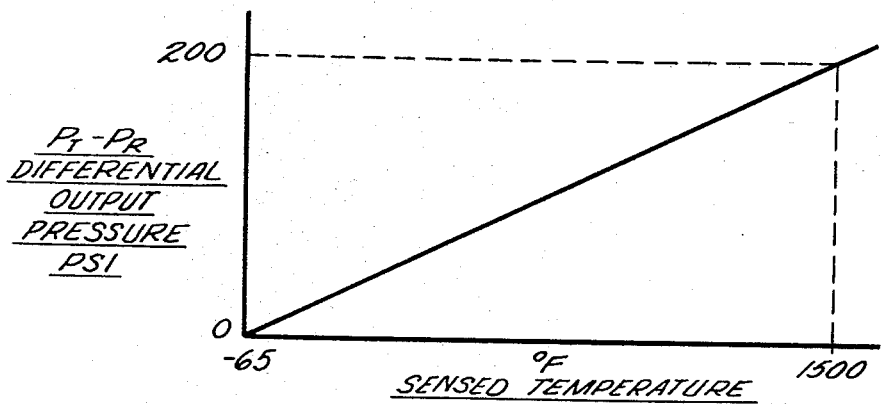
FIGURE 5 is a graphical plot of the linear relationship of sensed temperature and fluid servo output pressure.

To illustrate the conditions that may be encountered in a temperature transducer device such as described in this invention, when constructed to operate so that the controlled differential pressure $(P_T - P_R)$ is maintained in a linear relationship to the sensed temperature T, a fixed starting or reference point for the temperature T may be established at $-65°$ F. at a pressure $P_T - P_R$ of zero, at 1500° F., the pressure $P_T - P_R$ may be selected at 200 p.s.i. The linear relationship of sensed temperature T versus fluid servo differential output pressure $P_T - P_R$ is shown in FIGURE 5.

While I have illustrated and described a preferred embodiment of my invention, it is to be understood that such is merely illustrative and not restrictive and that variations and modifications may be made therein without departing from the spirit and scope of my invention. I therefore do not wish to be limited to the precise details set forth but desire to avail myself of such changes as fall within the purview of my invention.

What I claim is:

1. In combination, a source of pressurized fluid, a thermally responsive element having a physical displacement in response to a change in sensed temperature, a spool valve mechanism having a null position and controlling said source of pressurized fluid to produce a single controlled fluid outlet flow and pressure, first linkage means operatively connecting said thermal element and said valve mechanism to initially axially displace said valve mechanism responsive to changes in sensed temperature, pressure responsive means having a physical displacement responsive to changes in said single controlled outlet pressure, second linkage means operatively connecting said pressure responsive means and said first linkage means and pivotably connected to said valve mechanism such that said valve mechanism responsive to displacement of said pressure responsive means is axially displaced in a direction opposite to that of said initial displacement to return said valve mechanism to said null position and thereby control said single outlet pressure such that said outlet pressure is a straight line function of the displacement of said thermally responsive element.

2. In combination, a source of pressurized fluid, a rapid dynamic response rate differential expansion temperature sensing probe having a relatively thin outer shell surrounding a relatively thick inner rod, said temperature sensing probe producing changes in physical displacement of a movable portion thereof responsive to variations in sensed temperature, a spool valve mechanism including a housing and a valve spool controlling said source of pressurized fluid to produce a unitary control outlet pressure and flow responsive to displacement of said valve spool, first linkage means operatively connected to said temperature sensing probe and said valve spool such that a first displacement of said valve spool results from a change in sensed temperature, a pressure position means producing a physical displacement responsive to changes in said unitary control outlet pressure, second linkage means operatively connected to said pressure means and said first linkage means and pivotably connected to said valve spool, said valve spool operatively connected to said pressure position means such that said first axial displacement of said valve spool will result in a change in the magnitude of said unitary control pressure thereby causing a displacement of said pressure position means which will axially reposition said valve spool to a hydraulic balance or null position to thereby maintain the magnitude of said unitary control outlet pressure linearly proportional to the magnitude of said sensed temperature.

References Cited

UNITED STATES PATENTS

| | | | |
|---|---|---|---|
| 2,484,557 | 10/1949 | Eckman | 73—388 X |
| 2,980,065 | 4/1961 | Werts | 137—85 |
| 2,985,374 | 5/1961 | Jensen | 137—85 X |
| 2,989,034 | 6/1961 | Puster | 137—85 X |
| 2,993,498 | 7/1961 | Brand | 137—85 |
| 3,064,476 | 11/1962 | Naples | 73—363 |
| 3,256,740 | 6/1966 | Tate et al. | 73—388 |

LOUIS R. PRINCE, *Primary Examiner.*

DAVID SCHONBERG, *Examiner.*

DANIEL M. YASICH, *Assistant Examiner.*